Aug. 20, 1929. A. T. KATHNER Re. 17,413
ANNEALING AND HEAT TREATING FURNACE
Original Filed May 26, 1926 2 Sheets-Sheet 1
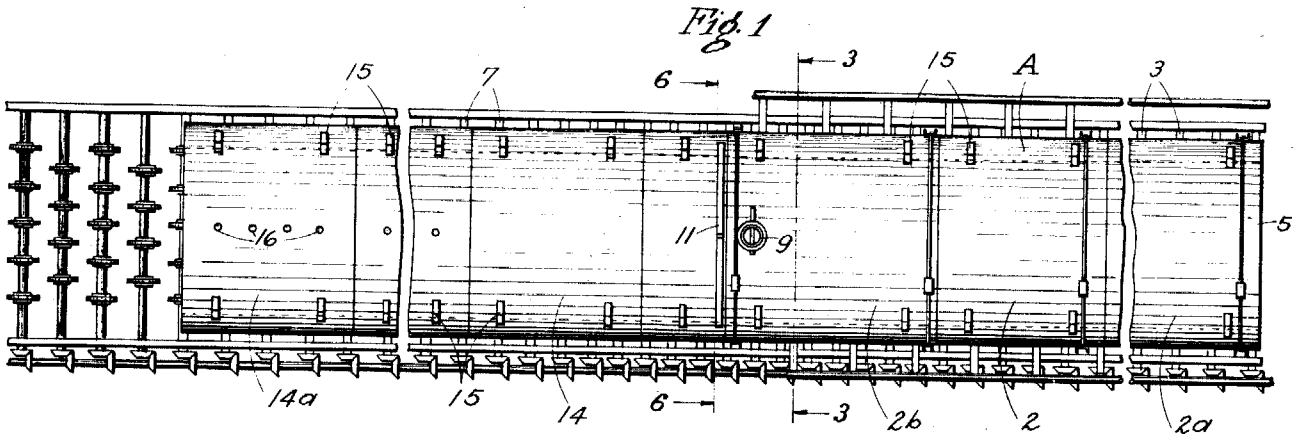
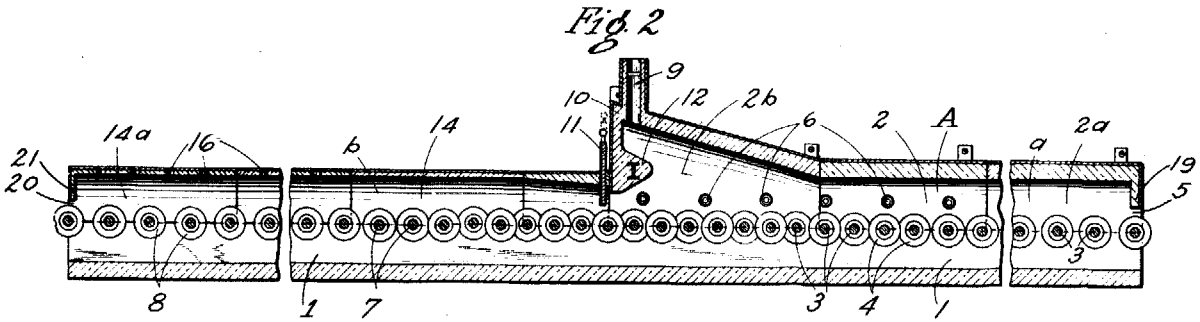
INVENTOR
ARTHUR T. KATHNER
BY Richey & Watts
ATTORNEY Aug. 20, 1929. A. T. KATHNER Re. 17,413

ANNEALING AND HEAT TREATING FURNACE

Original Filed May 26, 1926 2 Sheets-Sheet 2

INVENTOR
ARTHUR T. KATHNER
BY Richey & Watts
ATTORNEY

Reissued Aug. 20, 1929. Re. 17,413

UNITED STATES PATENT OFFICE.

ARTHUR T. KATHNER, OF MOUNT LEBANON, PENNSYLVANIA.

ANNEALING AND HEAT-TREATING FURNACE.

Original No. 1,669,902, dated May 15, 1928, Serial No. 111,754, filed May 26, 1926. Application for reissue filed May 10, 1929. Serial No. 362,094.

This invention relates broadly to furnaces for annealing and heat treating metals, and more specifically to a furnace for normalizing, annealing, heat-treating and processing metal sheets, plates, slabs, bars and the like.

The primary object of the invention is to provide a continuous furnace of multiple type adapted to meet the various peculiar requirements involved in the treatment and processing of metals whereby the latter may be given practically any required character or quality obtainable through heat treatment. More specifically stated, it is designed that the furnace may be employed economically for effecting any and all of the annealing, normalizing and processing operations required to impart to the metal the characteristics which are desired and which are obtainable by or through heat treatment which operations have heretofore been effected only by the employment of numerous different forms or types of furnaces.

A further object is to provide a continuous furnace of the character referred to having certain improved features of constructions providing for regulation of the temperature and the rate of cooling required to produce any desired character of annealing and whereby a material economy in the time involved in the treatment or processing of the metal may be effected.

Heretofore metal-heating furnaces have customarily, so far as I am aware, been of the so-called "solid" or permanent type, that is, the bottom and side walls and usually the roof have been made of permanently laid brickwork. When any repair to or replacement of the walls or parts thereof was necessary the furnace had to be shut down for a prolonged period while it was being cooled to a temperature which would permit workmen to work in the furnace, while the repairs were being made and the mortar was setting, and while the furnace was being reheated to the desired temperature. Moreover, in furnaces having conveyors, repairs or replacement of the conveyor could only be made by shutting down the furnace as aforesaid and tearing down parts of the walls to permit replacement of the conveyor parts which could not be repaired in place. The conveyor parts were not readily accessible and a workman had to enter the furnace to make repairs thereto.

By the present invention all such prolonged delays are greatly decreased if not practically eliminated. The sectional construction of the roof and parts of the side walls permits removal of any section and prompt replacement thereof by another, the removed section being set aside and repaired when convenient and without regard to operation of the furnace. Where conveyors are used in the furnace, the part or parts of the conveyor may be quickly removed and replaced by other similar parts without disturbance to or rebuilding of the side walls, or any material cooling of the furnace or delay in its operation.

Moreover the sectional construction gives to the furnace a wide range of flexibility never attained heretofore, so far as I am aware. For example, the length of the heating chamber or cooling chamber, or both, can be varied by simply shifting the interchangeable sections about on the lower side walls, or by using more cooling chamber arch sections and less heating chamber arch sections or vice versa, thus giving a variety of different heating cycles resulting in various physical characteristics in the heated metal.

With these and other important objects in view, the invention resides in the features of construction, arrangement of parts and combinations of elements which will hereinafter be fully described, reference being had to the accompanying drawings, in which—

Fig. 1 is a top plan view of the invention;

Fig. 2 is a longitudinal section on line 2—2 of Fig. 1;

Figure 3:
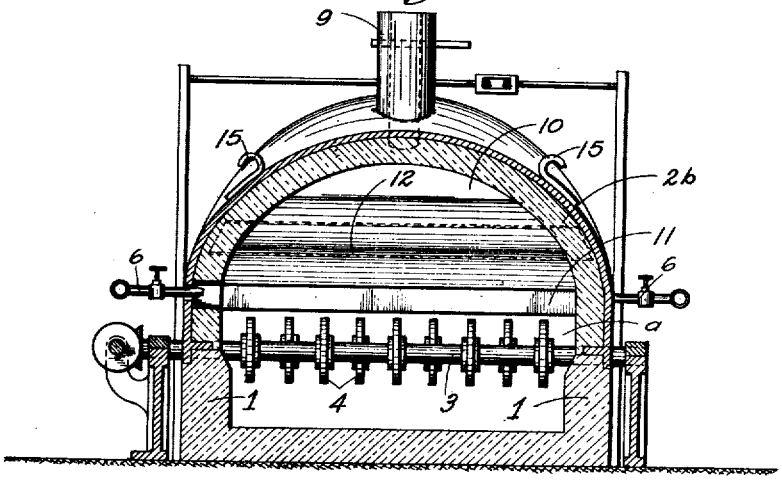
Fig. 3 is an enlarged transverse section on line 3—3 of Fig. 1.

Referring to said drawings, A designates generally a heating or normalizing furnace which comprises opposite lower side walls 1 of suitable height and a crown composed of a plurality of relatively abutting arch sections 2, $2^a$, $2^b$, 14 and $14^a$ which are superimposed upon said side walls 1. Suitably journaled upon and supported by means outside of said side walls 1 is a succession of suitably driven shafts 3 and 7 extending through the furnace and carrying conveyor discs 4 and 8 upon which sheets of metal, or packs of such sheets, are advanced through the furnace from the entrance end 5 of the latter. Fuel, as gas, for heating the chamber *a* may be supplied through suitably arranged burners 6, the products of combustion substantially enveloping the metal being heated.

Located in alignment, with the heating chamber *a* of said furnace and communicating with the forward end of the latter is a cooling chamber *b* through which the metal under treatment is advanced at any required rate of speed, and in which the rapidity of cooling is controlled or regulated to accord with the character of heat treatment required.

The products of combustion pass from the heating chamber *a* into the cooling chamber *b* in amounts regulatable as below described and surround the metal being treated and escape at the exit end of the chamber *b*.

The heating chamber *a* is formed by lower side walls 1 and arch sections 2, $2^a$ and $2^b$ of which section $2^a$ and $2^b$ are end sections. The sections 2, $2^a$ and $2^b$ are preferably all of the same length and are interchangeable and shiftable to different positions on the lower side walls 1. Since sections $2^a$ and $2^b$ are end sections they are always used as such and are not interchanged with sections 2. The sections 2 are of the same shape, size and configuration and may be used in any desired number between end sections $2^a$ and $2^b$ thereby permitting a change of length of the heating chamber when desired.

Section $2^b$ carries a damper controlled stack 9 which is located over the forward end of the heating chamber *a*, adjacent to the position of the front end, or fire wall, 10, which latter has its lower end disposed a suitable distance above the path of travel of the metal borne by the conveyor discs. A fire door baffle 11 is adjustable vertically relative to said path of travel at or adjacent to the end wall 10 whereby the passage of heat from the heating chamber *a* to the cooling chamber *b* may be controlled. A suitable deflector 12 is formed on or adjacent to the fire wall 10 whereby heat and other products of combustion may be directed to the stack 9 and also in any desired amount to the cooling chamber.

The cooling chamber *b* is formed by the lower side walls 1 and the arch sections 14 and $14^a$ of which section $14^a$ is an end section. These sections are all of the same length and are interchangeable and shiftable to different positions on the walls 1. Section $14^a$ is usually used only as an end section.

Since all the sections 2, $2^a$, $2^b$, 14 and $14^a$ are of the same length they may be substituted one for another along the lower side walls 1. It is thus possible easily to decrease the length of either chamber by removing one or more sections 2 or 14 and moving the remaining sections together to close the resulting gap. Likewise either chamber can be lengthened by adding sections 2 or 14 thereto. Since the walls 1 are of fixed length a lengthening of one chamber will result in a corresponding shortening of the other chamber but when one chamber is shortened the other chamber may be shortened or may retain its initial length.

The walls 1 may be, of course, lengthened if and when desired.

Figure 4:
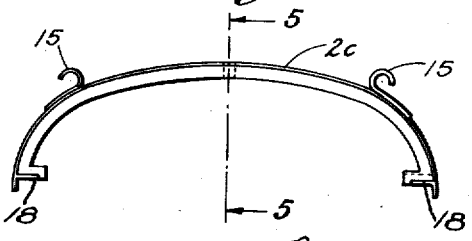
Fig. 4 is an end elevation of one of the removable arch sections of the furnace.
Figure 5:
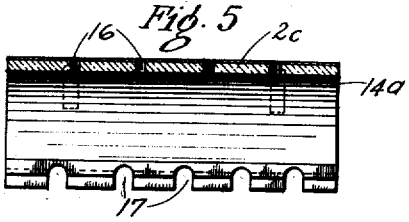
Fig. 5 is a longitudinal section of the invention taken on line 5—5 of Fig. 4.
Figure 6:
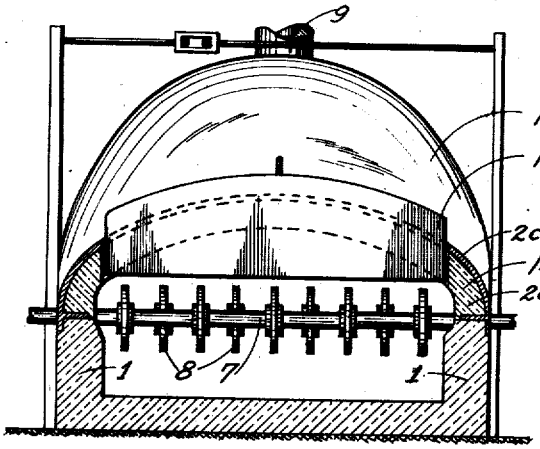
Fig. 6 is a transverse section of the invention, taken on line 6—6 of Fig. 1.

Each of the various arch sections 2, $2^a$, $2^b$, 14 and $14^a$ comprises a suitable metal frame structure, designated $2^c$ in Figs. 3 to 6, which carries in fixed relation thereto a lining $2^d$ of a suitable refractory material, and each of said sections has rigidly attached thereto carrying members, as hooks 15, to which the carrying chains of a lifting crane may readily be attached, as for bodily elevating or removing any selected section or sections.

Each metal frame of the removable sections has near its lower ends inwardly extending extensions 18 to rest upon the top faces of lower side walls 1, these extensions serving not only as smooth rigid members to seat on the walls 1 and distribute the weight of the frame and lining evenly thereover but also as means to retain the refractory lining in place in the frame.

It will be noted that the crowns of the heating chamber include a transverse roof wall and downwardly extending side walls which cooperate with the lower side walls 1 of the furnace; and that the crowns of the cooling chamber are similarly formed but that the side walls forming a part thereof are shorter than is the case with the crowns of the heating chamber.

The sectional arrangement or construction of the arch of the heat treating furnace has for one of its purposes to provide for expansion and contraction of the arch resulting from the widely varying temperatures maintained in the heating chamber without undue buckling or distortion and without derangement of either the conveyor or the driving mechanism, said sections being more or less free to move upon the side walls by which they are supported. Such freedom of movement is facilitated by the provision of shaft receiving recesses 17 of relatively large capacity in the lower edge portions of the arch sections. Moreover, when the lining of any section requires renewal or repair, such section may be bodily removed and a spare section kept for the purpose may immediately be introduced in the place of the removed section without shutting down the furnace, thus obviating the long delays which have heretofore been necessitated in cases where repairs, even of a minor nature, were required, such delays being greatly prolonged by the usual requirement that the furnace be allowed to cool off completely before repairs could be undertaken.

When an arch is removed the shafts therebeneath are exposed and can be removed by lifting the shafts upwardly after the bearing caps outside the furnace are removed.

The sectional construction of the cooling chamber also provides means for controlling the rate of cooling of the metal as it passes through said chamber. As is well understood in the art, the character and quality of the product is very materially controlled by regulation of the time of cooling following the heating to high temperatures. When rapid cooling to a predetermined temperature is desired, one or more selected sections 14 of the arch may be elevated from their places by means of a crane to permit of the escape of heat from the chamber *b* as required, following which they may be replaced. Obviously, a great variety of results may be arrived at by elevating or removing different sections of the arch from time to time and for different periods to vary the time and rate of cooling of the metal.

The inner surfaces of the cooling chamber roof or arch sections is considerably lower than the corresponding surface of the heating chamber roof or arches, as is clearly shown in Figure 2. This lower roof confines the products of combustion to relatively close contact with the metal passing through the chamber and assists in maintaining a positive gas pressure in the cooling chamber which prevents ingress of air, as about the shafts, and aids in the gradual and uniform cooling of the metal being treated. It will be understood that considerable quantities of furnace heating gases or combustibles and air are blown into the furnace through the burners 6 and that since the furnace has no draft stack and since the bleeder stack 90 is normally closed the gases can escape from the furnace only by passing out through the openings in the heating and cooling chambers; thus the gases introduced under several pounds pressure per square inch actually maintain a pressure inside the furnace which exceeds atmospheric pressure except possibly at the extreme outlet end of the cooling chamber.

It will be noted, from Fig. 2, that the furnace has restricted entrance and exit openings, the former being opening 5 formed by a wall 19 extending down from the section $2^a$ to close to the upper side of the conveyor, and the latter being opening 20 formed by a similar depending wall 21 on section $14^a$. The passage between heating chamber *a* and cooling chamber *b* is also restricted by the wall 10 extending down from the roof to near the top surface of the conveyor.

These walls 19 and 21 serve to confine heated gases and heat within the furnace while walls 21 and 10 cooperate with the lower roof or smaller cross sectional area of the cooling chamber *b* to produce a positive gas pressure in the cooling chamber. Such a pressure tends to reduce oxidation and scaling of the metal being treated during the cooling thereof. Moreover, the restriction 10 brings the gases into close and surrounding contact with the metal being treated and facilitates uniformity of cooling of the metal.

Vents 16 may be provided in some or all of the arch sections 14 for allowing the heat of the annealing chamber to escape gradually, as when gradual cooling of the metal is desirable, but these relatively small vents are normally kept closed except in the parts of the cooling chamber roof remote from the restricted passage where the temperature of the metal being treated is below an oxidizing temperature and even then kept closed there unless an increase in rate of heat dissipation is desired for certain desired physical properties. In cases where the period of cooling of the product is to be prolonged, the fire door 11 is elevated to the extent required for admitting heat to the cooling chamber.

Obviously, the rate of cooling may additionally be controlled by regulation of the speed at which the conveyor discs are driven.

Manifestly, any form of heating element or fuel, as gas, powdered coal, oil, tar and the like may be employed.

The chamber *a* shown, is constructed and adapted to serve as a normalizing chamber, that is, one in which the original, usually coarse, crystalline structure of the metal to be heated is broken down and a new, fine, crystalline structure is produced as is well known in the art. The chamber *b* by reason of its restricted inlet and outlet openings, its smaller cross sectional area and its lower roof is adapted to serve as a chamber in which the metal normalized in chamber *a* may be cooled in the presence of products of combustion under pressure.

Claims covering methods of treating metals which may be practiced in furnaces embodying the present invention are set forth in my copending applications for United States Letters Patents, Serial No. 270,637 filed April 17, 1928, and Serial No. 338,780 filed February 9, 1929.

What is claimed is:

1. A continuous annealing furnace comprising a heating chamber and a cooling chamber arranged in aligned relation and separated by a fire wall, said wall having a passage in its lower portion providing communication between said chambers, continuous means for conveying material through said chambers, a damper-controlled stack leading from the forward end of the heating chamber, means for deflecting products of combustion away from said passage and towards said stack, a shiftable fire-door for controlling the admission of heat through said passage, and means embodied in the cooling chamber whereby the rate of cooling of material passing through said chamber may be controlled.

2. A continuous annealing furnace comprising a heating chamber and a cooling chamber arranged in aligned relation and separated by a fire wall, said wall having a passage in its lower portion providing communication between said chambers, continuous means for conveying material through said chambers, a damper-controlled stack leading from the forward end of the heating chamber, means for deflecting products of combustion away from said passage and towards said stack, a shiftable fire-door whereby the admission of heat through said passage is controlled, said cooling chamber embodying an archlike top having sections which are removable for facilitating heat dissipation.

3. A continuous annealing furnace comprising a heating chamber and a cooling chamber arranged in aligned relation and separated by a fire wall, said wall having a passage in its lower portion providing communication between said chambers, continuous means for conveying material through said chambers, a damper-controlled stack leading from the forward end of the heating chamber, means for deflecting products of combustion away from said passage and towards said stack, a shiftable fire-door whereby the admission of heat through said passage is controlled, said cooling chamber including a top having sections thereof bodily removable for facilitating heat dissipation.

4. A continuous annealing furnace comprising a heating chamber and a cooling chamber arranged in aligned relation and separated by a fire wall, said wall having a passage in its lower portion providing communication between said chambers, continuous means for conveying material through said chambers, a damper-controlled stack leading from the forward end of the heating chamber, means for deflecting products of combustion away from the said passage and towards said stack, a shiftable fire-door whereby the admission of heat through said passage is controlled, said cooling chamber including a top having sections thereof bodily removable for facilitating heat dissipation, and said annealing chamber having a sectional arch mounted upon its side walls, the arch sections being shiftable in relation both to each other and to said walls, said sections also being separately removable.

5. A continuous annealing furnace comprising a heating chamber and a cooling chamber arranged in aligned relation and separated by a fire wall, said wall having a passage in its lower portion providing communication between said chambers, continuous means for conveying material through said chambers, a damper-controlled stack leading from the forward end of the heating chamber, means for deflecting products of combustion away from said passage and towards said stack, a shiftable fire-door whereby the admission of heat through said passage is controlled, said heating chamber having an arch formed of complemental bodily elevatable and removable sections.

6. A continuous annealing furnace of the character described, comprising a heating chamber and a cooling chamber arranged in aligned relation, a fire wall extending downwardly between said chambers to separate same and having an opening therein to provide a passage between the chambers, a stack arranged in the heating chamber, means in the stack for controlling the egress of heat and products of combustion from the heating chamber, a movable door adjacent to the fire wall for varying and controlling the passage of heat and products of combustion between the chambers, and means in the chambers for continually advancing material therethrough to be treated, said means being disposed below and spaced from said door to permit a predetermined amount of heat and products of combustion and the material to be treated to continually pass from the heating chamber to the cooling chamber.

7. A continuous annealing furnace of the character described, including a heating chamber and a cooling chamber arranged in aligned relation, a movable door between said chambers for controlling the passage of heat and the products of combustion between the same, and means for advancing material to be treated through said chambers, said means being disposed spaced from said door whereby a predetermined amount of heat and products of combustion and the material to be treated may be continuously passed from the heating chamber to the cooling chamber.

8. In a continuous furnace of the character described, lower side walls, a crown overlying said side walls, said crown including a plurality of unitary sections which, individually, are bodily elevatable and removable, each section including an arch and side walls, the latter having a depending arrangement relative to the former and being adapted for seating upon the said lower side walls, and conveyor mechanism including shafts extending across the furnace and through the lower walls and accessible for ready removal when the arch thereabove has been removed.

9. In a continuous furnace of the character described, lower side walls, conveyor mechanism including shafts extending across the furnace and through said side walls, and a crown overlying said side walls, said crown being composed of a plurality of complemental relatively abutting unitary sections which, individually, are bodily elevatable and removable, each section including an arch and side walls, the latter being adapted to seat upon the first mentioned side walls and in overlying relation to the shafts so as to permit removal of the latter upon elevation of the crown sections.

10. In a continuous furnace of the character described, lower side walls, conveyor mechanism including transverse shafts extending through said side walls, and a crown overlying said side walls, said crown being composed of a plurality of complemental relatively abutting unitary sections which, individually, are bodily elevatable and removable, each section including a metal frame forming an arch and side walls and being adapted to seat upon and form joints with the lower side walls in overlying relation to the shafts so as to permit removal of the latter upon elevation of the crown sections.

11. In a continuous furnace of the character described, lower side walls having shaft notches in the tops thereof, conveyor mechanism including transverse shafts in said notches, and a crown overlying said side walls and shafts, said crown being composed of a plurality of interchangeable, bodily elevatable and removable unitary sections adapted to seat upon the first mentioned side walls in a manner to permit removal of the shafts upon elevation of the crown sections.

12. In a continuous furnace of the character described, aligned heating and cooling chambers, the cooling chamber embodying a crown which includes elevatable arch sections and side walls adapted to permit access to conveyor mechanism therebelow, said arch sections normally occupying a lower level than that of the crown of the heating chamber and means for continuously conveying material through each of said chambers.

13. In a continuous furnace embodying a conveyor mechanism, aligned and continuously communicating heating and cooling chambers, said chambers embodying crowns including elevatable arch sections comprising top and side walls, the latter extending substantially to the level of said conveyor mechanism.

14. A continuous normalizing furnace having removable roof sections including portions of the side walls and having heating and cooling chambers through which products of combustion of a heating medium and metal to be normalized may pass continuously in the presence of each other, and means for maintaining a positive gas pressure in the cooling chamber.

15. In a continuous metal treating furnace, aligned, continuously open ended, continuously communicating heating and cooling chambers, means for continuously moving metal to be treated successively through the heating and cooling chambers, and means for continuously passing heated gases through the cooling chamber about the metal and out through the open exit end of the cooling chamber thereby controlling the rate and uniformity of cooling of the metal, the said last mentioned means including a restricted passage between the chambers and a cooling chamber roof imperforate for a large portion of its length beginning at the restricted passage.

16. In a continuous metal treating furnace, aligned, continuously open ended, continuously communicating heating and cooling chambers, means for continuously moving metal to be treated successively through the heating and cooling chambers, and means for continuously passing heated gases and products of combustion through the cooling chamber about the metal and out through the open exit end of the cooling chamber thereby controlling the rate and unformity of cooling of the metal, said last mentioned means including an adjustably controlled restricted passage between the heating and cooling chambers.

17. In a continuous metal treating furnace, aligned, continuously open ended, continuously communicating heating and cooling chambers, means for continuously moving metal to be treated successively through the heating and cooling chambers, and means for continuously passing heated gases through the cooling chamber about the metal and out through the open exit end of the cooling chamber, thereby controlling the rate and uniformity of cooling of the metal, said last mentioned means including a restricted passage between the heating and cooling chambers and a smaller cross sectional area in the cooling chamber than in the heating chamber.

ARTHUR T. KATHNER.

DISCLAIMER

Re. No. 17,413.—*Arthur T. Kathner*, Mount Lebanon, Pa. ANNEALING AND HEAT-TREATING FURNACE. Patent dated August 20, 1929. Disclaimer filed June 5, 1931, by the patentee, exclusive licensee, *The Duraloy Company*, approving.

Hereby does disclaim from the scope of claims 15 and 17 of the said Reissue Letters Patent No. 17,413, any and all furnaces except metal sheet treating furnaces in which the furnace causes a gradual and prolonged cooling of the metal sheet in the furnace.

[*Official Gazette June 23, 1931.*]